Patented Jan. 4, 1938

2,104,584

UNITED STATES PATENT OFFICE 2,104,584

DOUBLE SALTS OF COPPER ARSENITE AND A COPPER SALT OF A HIGHER UNSATURATED FATTY ACID

Frederick E. Dearborn, Washington, D. C., dedicated to the free use of the Public in the United States No Drawing. Application October 15, 1934, Serial No. 748,365

3 Claims. (Cl. 260—12)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to me of any royalty thereon.

I hereby dedicate the invention herein described to the free use of the public in the territory of the United States of America to take effect upon the granting of a patent to me.

The present invention comprehends a new compound or compounds having the composition hereinafter specifically set forth and the mode or process of manufacturing the same which will now be fully described and specifically stated in the following claims, it being understood, however, that changes may be made in such composition of matter and in the step or steps, in question, without departing from the spirit of the invention.

I have found that a complex compound or compounds can be made containing arsenic, copper and the anhydride of a fatty acid of the general formulae $C_nH_{2n-4}O_2$ and $C_nH_{2n-6}O_2$. The compounds are greenish in color and are entirely suitable for insecticidal and fungicidal use. They are practically insoluble in water, with relatively low water-soluble arsenic content.

As indicated the principal and poisonous ingredient in my new insecticide or insecticides comprises mainly a complex compound of three molecules of copper meta-arsenite united with one molecule of the copper salt of a fatty acid of the general formulae $C_nH_{2n-4}O_2$ and $C_nH_{2n-6}O_2$. For example, copper linoleo-arsenite, $$(3CuAs_2O_4.CuC_{36}H_{62}O_4)$$

and linoleno-arsenite $(3CuAs_2O_4.CuC_{36}H_{58}O_4)$.

In carrying out my invention I first form an alkali metal salt of the fatty acid by neutralization of the free fatty acid or by saponifying a vegetable, animal or fish oil or fat containing an appreciable amount of the glyceride or glycerides of the fatty acid or acids of the series $C_nH_{2n-4}O_2$ and $C_nH_{2n-6}O_2$. The resulting soap may be separated from the other saponification products or used without separation in the formation of the new composition of matter. To the soap solution is added the required amount of a solution of a water-soluble arsenite, for example, sodium or potassium arsenite. The soap-arsenite mixture is partially neutralized with a suitable acid, for example, dilute hydrochloric acid, the solution however being kept on the alkaline side to prevent precipitation of the fatty acid or acids. To this partially neutralized solution is slowly added, with vigorous agitation, a solution of a soluble copper salt, for example, copper chloride. A greenish yellow precipitate immediately forms. The mixture should be neutral or slightly alkaline to red litmus paper, if too strongly alkaline, dilute acid is added. The mass is heated or boiled, with continuous agitation, until the precipitate changes from a greenish yellow to a bluish green or green color. At this point the heating is discontinued, and dilute acid added until the mass has a decided acid reaction to blue litmus paper. The precipitate is allowed to stand several hours, so that any copper oxide and copper arsenite formed during the alkaline stage, may be re-dissolved. The precipitate is then well washed with water and dried.

The compound or compounds may be prepared from the pure fatty acid or acids or from the vegetable, animal, or fish oils and fats containing appreciable amounts of the glyceride or glycerides of the fatty acids of the general formulae $C_nH_{2n-4}O_2$ and $C_nH_{2n-6}O_2$. When the insecticide is made from a vegetable, animal, or fish oil and fat there will be formed and intimately mixed a number of compounds of the general formula, $3CuAs_2O_4.CuOR$, in which R represents the anhydride of a fatty acid of the series $C_nH_{2n-4}O_2$ and $C_nH_{2n-6}O_2$. For example, linseed oil contains approximately 48% linoleic and 34% linolenic acids. Tung oil contains approximately 73% elaeostearic acid, which belongs to the $C_nH_{2n-6}O_2$ series of acids. Not only are the true compounds of the general formula $3CuAs_2O_4.CuOR$ produced, but there are also formed some copper salts of the fatty acids present. Hence the insecticide, when made from fats and oils, will be composed of a mixture of the compounds $3CuAs_2O_4.CuOR$ and the copper salts of the fatty acids (R) present in the fats and oils used.

The proportion of copper, arsenic, and fatty acid to be mixed may be calculated from the formula $3CuAs_2O_4.CuOR$, where R represents the anhydride of the fatty acid. For example, the following are given as illustrations, using pure fatty acids.

1. Copper linoleo-arsenite formula—

$$3CuAs_2O_4.CuC_{36}H_{62}O_4$$

containing 40.74% $As_2O_3$; 21.88% CuO; and 37.38% linoleic anhydride. To produce 100 grams of the compounds the following weights of materials are theoretically required.

| | Grams |
|---|---|
| Sodium arsenite ($Na_2HAsO_3$) | 70.0 |
| Cupric chloride ($CuCl_2 2H_2O$) | 46.8 |
| Linoleic acid | 38.6 |

2. Copper linoleno-arsenite formula $$3CuAs_2O_4.CuC_{36}H_{58}O_4$$

containing 40.48% $As_2O_3$; 21.70% CuO; and 37.82% linolenic anhydride.

To produce 100 grams of the compound the following weights of materials are theoretically required.

Arsenous acid sodium hydroxide;
$As_2O_3+4NaOH$, 40.48 gms. $As_2O_3+32.7$ gms. NaOH
Copper sulfate $CuSO_4.5H_2O$, 68.1 gms.
Linolenic acid, 39.1 gms.

3. Copper elaeostearo-arsenite formula $$3CuAs_2O_4.CuC_{36}H_{58}O_4,$$

this acid is an isomer of linolenic acid with the same formula and molecular weight, hence the complex compound will have the same percentage composition as the copper linoleno-arsenite.

An excess of the copper and arsenic salts, if not too great, may be used as cupric arsenite and copper oxide are soluble in dilute acids, thus removing them from the insecticides as impurities.

Having fully disclosed my invention I claim:
1. A new compound of the general formula $3CuAs_2O_4.CuOR$, in which R is the anhydride of linolic acid.
2. A new compound of the general formula $3CuAs_2O_4.CuOR$, in which R is the anhydride of linolenic acid.
3. A new compound of the general formula $3CuAs_2O_4.CuOR$, in which R is the anhydride of elaeostearic acid.

FREDERICK E. DEARBORN.